United States Patent
Cancilla et al.

(10) Patent No.: US 10,956,306 B2
(45) Date of Patent: *Mar. 23, 2021

(54) DEBUGGING STREAMING APPLICATIONS USING DEBUG REGIONS

(71) Applicant: INTERNATIONAL BUSINESS MACHINES CORPORATION, Armonk, NY (US)

(72) Inventors: James E. Cancilla, Mississauga (CA); Samantha Chan, Toronto (CA); Mary M. L. Komor, Markham (CA); Peter A. Nicholls, Janetville (CA)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/734,371

(22) Filed: Jan. 5, 2020

(65) Prior Publication Data
US 2020/0142812 A1 May 7, 2020

Related U.S. Application Data

(63) Continuation of application No. 15/135,801, filed on Apr. 22, 2016, now Pat. No. 10,558,555.

(51) Int. Cl.
*G06F 11/36* (2006.01)

(52) U.S. Cl.
CPC ...... *G06F 11/3664* (2013.01); *G06F 11/3636* (2013.01)

(58) Field of Classification Search
CPC .................. G06F 11/3664; G06F 11/3636
See application file for complete search history.

(56) References Cited

U.S. PATENT DOCUMENTS

| 5,630,049 A | 5/1997 | Cardoza |
| 6,981,243 B1 | 12/2005 | Browning |
| 8,327,337 B2 | 12/2012 | Barsness |
| 8,924,939 B2 | 12/2014 | Branson |

(Continued)

OTHER PUBLICATIONS

De Pauw et al., "Visual Debugging for Stream Processing Applications," Runtime Verification, 2010, p. 18-35, LNCS 6418, Springer-Verlag Berlin Heidelberg.

(Continued)

*Primary Examiner* — Doon Y Chow
*Assistant Examiner* — Timothy P Duncan
(74) *Attorney, Agent, or Firm* — Michael O'Keefe

(57) ABSTRACT

A method for debugging a streaming application is provided. The method may include establishing, by a processor, a debug region in the streaming application to mark a subgraph for debugging. The method may further include receiving a tuple flow suspension notification from a job control plane. The method may also include displaying a plurality of debugging options for debugging a streaming application on a graphical user interface based on the received tuple flow suspension notification. The method may further include determining a debugging option from the displayed plurality of debugging options based on a user selection on the graphical user interface. The method may also include translating the determined debugging option into a format compatible with the job control plane. The method may further include transmitting the translated debugging option to the job control plane.

20 Claims, 9 Drawing Sheets

(56) References Cited

U.S. PATENT DOCUMENTS

| | | |
|---|---|---|
| 2010/0293532 A1 | 11/2010 | Andrade |
| 2013/0305225 A1 | 11/2013 | Branson |
| 2014/0095506 A1 | 4/2014 | Branson |
| 2015/0007143 A1 | 1/2015 | Barsness |
| 2016/0328464 A1 | 11/2016 | Branson |
| 2016/0350427 A1 | 12/2016 | Cao |
| 2017/0033979 A1 | 2/2017 | Cradick |
| 2017/0052874 A1 | 2/2017 | Barsness |
| 2017/0070571 A1 | 3/2017 | Branson |
| 2017/0153966 A1 | 6/2017 | Cao |
| 2017/0235555 A1 | 8/2017 | Cook |
| 2017/0308458 A1 | 10/2017 | Cancilla |
| 2018/0011777 A1 | 1/2018 | Cancilla |

OTHER PUBLICATIONS

Edwards et al., "DTVS: a Distributed Trace Visualization System", in Proceedings of 6th IEEE Symposium on Parallel and Distributed Processing, Dallas, TX, Oct. 26-29, 1994 (Year: 1994).

IBM, "Debugging Streams Processing Applications," IBM Knowledge Center, p. 1-43, IBM InfoSphere Streams Version 4.0.0, https://www.ibm.com/support/knowledgecenter/SSCRJU_4.0.0/com.ibm.streams.dev.doc/doc/sldebugger-container.html, Accessed on Apr. 21, 2016.

IBM, "Developing Streams Processing Applications with Consistent Regions," IBM Knowledge Center, p. 1-2, IBM InfoSphere Streams Version 4.0.0, https://www.ibm.com/support/knowledgecenter/api/content/nl/en-us/SSCRJU_4.0.0/com.ibm.streams.dev.doc/doc/consistentregions.html, Accessed on Apr. 21, 2016.

Jacques Da Silva, "Guaranteed Tuple Processing in InfoSphere Streams v4 with Consistent Regions," IBM Streams Developer Community, Feb. 20, 2015, p. 1-7, https://developer.ibm.com/streamsdev/2015/02/20/processing-tuples-least-infosphere-streams-consistent-regions/, Accessed on Apr. 21, 2016.

Mell et al., "The NIST Definition of Cloud Computing," National Institute of Standards and Technology, Sep. 2011, p. 1-3, Special Publication 800-145.

StreamBase, "Using the EventFlow Debugger", https://docs.tibco.com/pub/streambase_cep/7.3.10/doc/testdebug/debug-visual.html, Copyright 2004-2014, Accessed on Dec. 13, 2017 (Year: 2014).

IBM: List of IBM Patents or Patent Applications Treated As Related (Appendix P), Mar. 11, 2020, pp. 1-2.

DEBUGGING STREAMING APPLICATIONS USING DEBUG REGIONS

BACKGROUND

The present invention relates, generally, to the field of computing and, more particularly, to software development data processing.

During the development cycle and consumer use of computer software products, debugging may be required to remove errors experienced by users operating the software. Software debugging may relate to the process of identifying and correcting or bypassing errors within the operation of a software program. Debugging tools, or debuggers, are programs developed to debug programs by analyzing data processed by the subject program. Various debugging techniques may be utilized when debugging a system, such as print debugging, remote debugging, and delta debugging.

SUMMARY

According to one exemplary embodiment, a method for debugging a streaming application is provided. The method may include establishing a debug region in the streaming application to mark a subgraph for debugging. The method may further include receiving a tuple flow suspension notification from a job control plane, whereby the received tuple flow suspension notification indicates a tuple flow associated with the streaming application has been suspended by the job control plane. The method may also include displaying a plurality of debugging options for debugging a streaming application on a graphical user interface based on the received tuple flow suspension notification. The method may further include determining a debugging option from the displayed plurality of debugging options based on a user selection on the graphical user interface. The method may also include translating the determined debugging option into a format compatible with the job control plane. The method may further include transmitting the translated debugging option to the job control plane.

According to another exemplary embodiment, a computer system for debugging a streaming application is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include establishing a debug region in the streaming application to mark a subgraph for debugging. The method may further include receiving a tuple flow suspension notification from a job control plane, whereby the received tuple flow suspension notification indicates a tuple flow associated with the streaming application has been suspended by the job control plane. The method may also include displaying a plurality of debugging options for debugging a streaming application on a graphical user interface based on the received tuple flow suspension notification. The method may further include determining a debugging option from the displayed plurality of debugging options based on a user selection on the graphical user interface. The method may also include translating the determined debugging option into a format compatible with the job control plane. The method may further include transmitting the translated debugging option to the job control plane.

According to yet another exemplary embodiment, a computer program product for debugging a streaming application is provided. The computer program product may include one or more computer-readable storage devices and program instructions stored on at least one of the one or more tangible storage devices, the program instructions executable by a processor. The computer program product may include program instructions to establish a debug region in the streaming application to mark a subgraph for debugging. The computer program product may further include program instructions to receive a tuple flow suspension notification from a job control plane, whereby the received tuple flow suspension notification indicates a tuple flow associated with the streaming application has been suspended by the job control plane. The computer program product may also include program instructions to display a plurality of debugging options for debugging a streaming application on a graphical user interface based on the received tuple flow suspension notification. The computer program product may further include program instructions to determine a debugging option from the displayed plurality of debugging options based on a user selection on the graphical user interface. The computer program product may also include program instructions to translate the determined debugging option into a format compatible with the job control plane. The computer program product may further include program instructions to transmit the translated debugging option to the job control plane.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
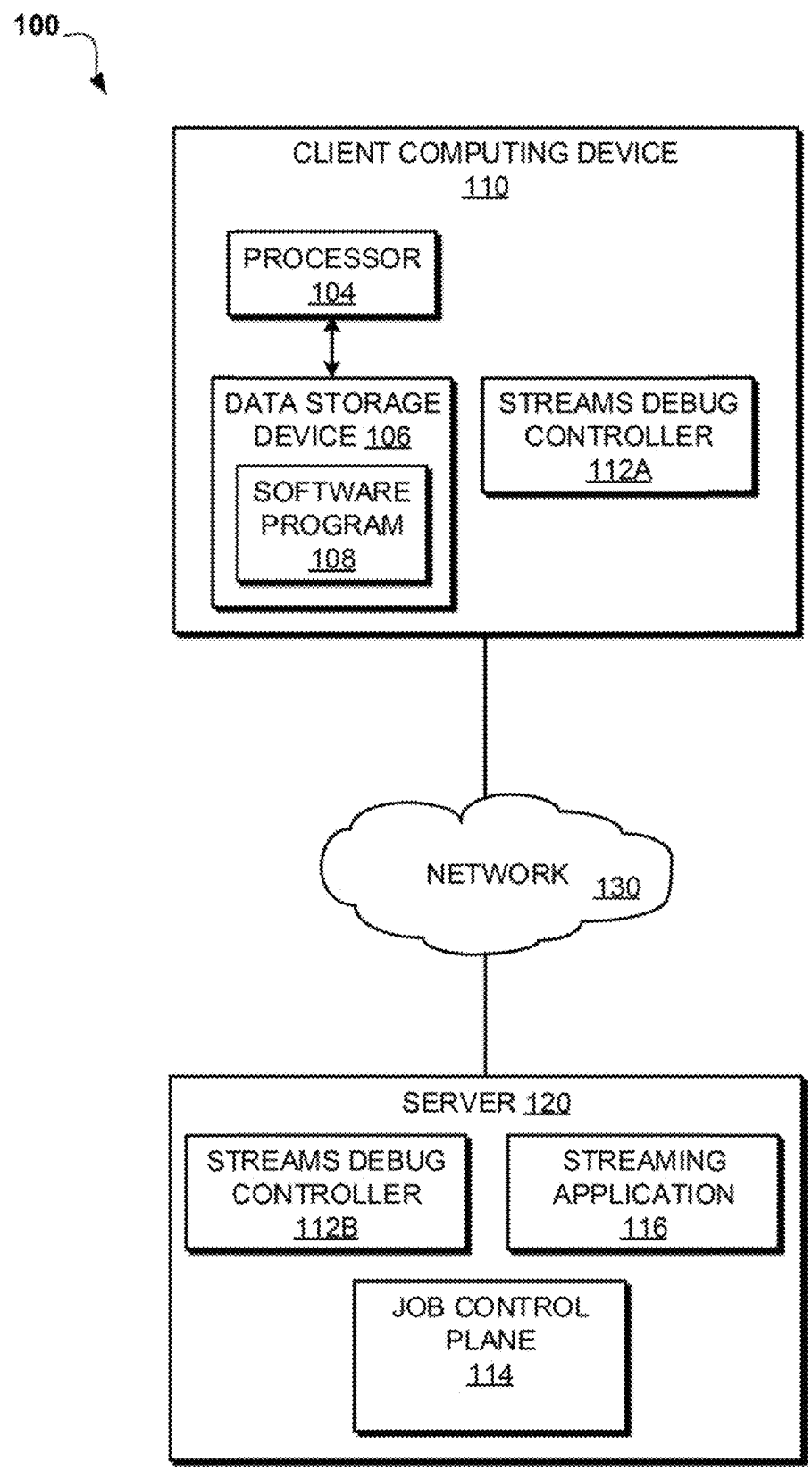
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing software and, more particularly, to software development data processing. The following described exemplary embodiments provide a system, method, and program product to, among other things, implement debugging software for a streaming application that allows a user manipulate the flow of data within a data stream processed by the streaming application. Therefore, the present embodiment has the capacity to improve the technical field of software development data processing by allowing a user to replay data within a data stream, slow the performance of the streaming application, and return the streaming application to a previous application state.

As previously described, during the development cycle and consumer use of computer software products, debugging may be required to remove errors experienced by users operating the software. Software debugging may relate to the process of identifying and correcting or bypassing errors within the operation of a software program. Debugging tools, or debuggers, are programs developed to debug programs by analyzing data processed by the subject program. Various debugging techniques may be utilized when debugging a system, such as print debugging, remote debugging, and delta debugging.

A streaming application may relate to a distributed, in-memory data processing program. Whereas traditional data warehousing applications require data to be stored and processed by powerful machines offline to gather insight, a streaming application gathers data insight in real-time by analyzing data in memory as the data is being transmitted through a network. To handle the large volume and variety of data that may be ingested into the program, the workload is distributed across multiple processing elements in a cluster of servers.

Streaming applications may utilize a consistent region framework during execution to guarantee data processing. A streaming application may contain a variety of operators that rely on many different calls and processes. In order to facilitate guaranteed data processing, the consistent region framework may drain data and create a checkpoint of the streaming application. Draining data may relate to the process of flushing all data from memory so no data remains within the streaming application. Upon draining all data from memory, the streaming application may then be in a consistent state. Once a consistent state is achieved, the internal state of the streaming application is saved within a checkpoint. A checkpoint may be the application state at a particular point in time. The saved checkpoint may allow a user to return to an earlier state of the streaming application in the event of an application error or system error.

Furthermore, the consistent region framework may prevent data loss in case of an application failure. At-least-once tuple processing may be achieved by maintaining a consistent state for operators in a consistent region. A consistent state may be established by iterating through a drain-suspend-checkpoint-resume cycle. A cycle trigger, such as an application failure, may cause the operators in a consistent region to be reset to a previous consistent state. After a reset, tuples arriving subsequent to the checkpoint may be replayed.

A streaming application may be capable of ingesting and analyzing data very quickly in order to efficiently perform core functions. Typically, a streaming application includes multiple operators capable of performing a specific action, such as calculating results or transforming data. Furthermore, typical streaming applications may process data available only in-memory and, once the original data is processed, is no longer available. As a result of the fast processing speeds and in-memory architecture of a streaming application, debugging streaming applications may be difficult due to unique challenges, such as inability to replay data, slow the streaming application, or return the application to a previous state.

In the event of an error within a streaming application, a user debugging the streaming application may wish to replay the data prior to the error's occurrence. However, replaying data may not be possible if the data was only available in-memory. Furthermore, the state of individual operators may change from tuple-to-tuple. Therefore, even if an individual tuple could be replayed at a later time, the underlying application may not have the same behavior as was exhibited when the tuple was first processed. A tuple may relate to a finite ordered set of values passed as a string of data from one processing element to another.

Additionally, slowing the data stream of a streaming application may aid in the debugging process. An important aspect of the debugging process is the capability of monitoring the internal state of the streaming application to determine if the underlying logic is executing as expected. Due to the speed at which data arrives in a streaming application, user control over the tuple flow rate is imperative to an investigation into internal state changes caused by the processing of individual tuples. Typically, a throttle operator may be implemented to regulate the speed of a data flow to a specified rate. However, while a throttle operator may be capable of slowing the speed of a streaming application, a throttle operator may not provide enough user control to allow for efficient debugging.

Furthermore, standard debugging software does not provide the capability to rewind, or return, the streaming application to a previous state. Generally, debugging applications are an iterative process whereby users move forward and backward through the application logic in order to pinpoint where a variable was modified or a particular event occurred. In the context of debugging, rewinding a streaming application to a previous point in time and then continuing to move forward again with the same data may not be currently practiced.

Current methods of debugging a streaming application also involve writing data to files or the console. After the written data is processed, the output is analyzed to determine whether any errors were experienced within the written data. In order to investigate problems using this approach, the correct information must be written out. However, users may often need to perform multiple updates of a print statement since the location of the problem may not be obvious. Furthermore, examining log files may be categorized as a post-mortem process, which does not necessarily represent a true debugging environment.

In addition to print formatted strings (i.e. printf format strings) and print debugging (i.e. tracing), users may also currently debug a streaming application using a streams debugger or attaching a traditional procedural debugger to the actual command processing program or Java process that executes the operator logic. In such traditional debugging methods, users may be forced to focus on the logic of the individual operator. Additionally, users may be forced to control the execution of the streaming application at the individual operator level. Furthermore, neither approach may be an intuitive method for debugging a streaming application. Since users may be more inclined to implement a data-first approach when debugging a streaming application, user manipulation of the data flow within the streaming application may be a desirable aspect of a debugger for a streaming application. As such, it may be advantageous, among other things, to implement a debugger for streaming applications that leverages the consistent region framework to define a debug region as an extension of the consistent region thereby allowing a user to debug problematic portions of a streaming application (i.e. a subgraph). Furthermore, leveraging the consistent region framework may provide a data-centric debugger capable of allowing user manipulation of a data stream.

According to one embodiment, data stepping may be implemented to aid in the debugging process of streaming applications. Data stepping may relate to the process of controlling the tuple flow based on user designation. Tuple flow may relate to a stream of data received and processed by a streaming application. A streaming application debugger, or a streams debug controller, that utilizes data stepping may allow a user to control the tuple flow of the streaming application without consideration for individual operators. The streams debug controller may leverage the existing consistent region framework to create a debug region as an extension of the existing consistent region that a user can define in a streams application. Despite a consistent region and a debug region coexisting in a streams application, the streams debug controller may only affect the debug region and not a generic consistent region thereby allowing a user to debug a known problematic portion of a streaming application (i.e. a subgraph) without affecting other data flows in the application. Furthermore, the streams debug controller may be able to step a debug region forward incrementally, such as n-tuples at a time, based on user designation.

By leveraging the consistent region framework, a streams debug controller utilizing data stepping may allow for a suspension of the tuple flow within a debug region of a streaming application upon the occurrence of a user-defined trigger. The user-defined trigger may be an anomaly within the data, a special marker inserted by the user to indicate the application should be suspended, or a user-defined condition in the streaming application or system. Furthermore, after suspending the tuple flow of the streaming application and upon user selection, the streams debug controller may be capable of returning the debug region of the streaming application to a previous state based on a user selection of saved checkpoints and replaying subsequently received tuples from the user-selected checkpoint. Additionally, the streams debug controller may allow for substitute data to be injected into the data stream after the debug region has been returned to the user-selected checkpoint.

The streams debug controller may also be capable of defining a sub-graph to debug and controlling the tuple flow within a problematic area. Additionally, the streams debug controller may debug a sub-graph within a streaming application without incurring a significant performance penalty. Once the streaming application reaches a checkpoint based on a user-defined checkpoint policy, the streams debug controller may allow a user to define particular actions to be executed after the checkpoint.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product that implement a streams debug controller that allows the consistent region framework to be leveraged to create a data-centric debugger for streaming applications.

Referring to FIG. 1, an exemplary networked computer environment 100 is depicted, in accordance with one embodiment. The networked computer environment 100 may include a client computing device 110 and a server 120 interconnected via a communication network 130. According to at least one implementation, the networked computer environment 100 may include a plurality of client computing devices 110 and servers 120, only one of each is shown for illustrative brevity.

The communication network 130 may include various types of communication networks, such as a wide area network (WAN), local area network (LAN), a telecommunication network, a wireless network, a public switched network and/or a satellite network. The communication network 130 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 110 may include a processor 104 and a data storage device 106 that is enabled to host a software program 108 and a streams debug controller 112A and communicate with the server 120 via the communication network 130, in accordance with one embodiment of the invention. The client computing device 110 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 110 may include internal components 502a and external components 504a, respectively.

The server computer 120 may be a laptop computer, netbook computer, personal computer (PC), a desktop computer, or any programmable electronic device or any network of programmable electronic devices capable of hosting a streams debug controller 112B, an operator, such as a job control plane (JCP) 114, and a streaming application 116, and communicating with the client computing device 110 via the communication network 130, in accordance with embodiments of the invention. As will be discussed with reference to FIG. 5, the server computer 120 may include internal components 502b and external components 504b, respectively. The server 120 may also operate in a cloud computing service model, such as Software as a Service (SaaS), Platform as a Service (PaaS), or Infrastructure as a Service (IaaS). The server 120 may also be located in a cloud computing deployment model, such as a private cloud, community cloud, public cloud, or hybrid cloud.

According to the present embodiment, the streams debug controller 112A, 112B may be a debugging program capable of translating user debugging actions into code compatible with the JCP 114 to issue instructions to a streaming application 116. By issuing translated user debugging actions, the streams debug controller 112A, 112B may enable a user to issue commands to checkpoint the streaming application 116 on-demand, control the tuple flow of the streaming application 116, step the streaming application 116 tuple flow by n-tuples, and replay tuples in the tuple flow as desired. The streams debug controller method is explained in further detail below with respect to FIGS. 2A-2C.

The JCP 114 may be a program capable of controlling the tuple flow within a streaming application 116, via the consistent region framework. Additionally, the JCP 114 may be capable of directing the streaming application 116 to perform various tasks, such as drain all tuples stored within memory, perform a checkpoint to establish a consistent state, suspend the tuple flow, reset the application state to a stored checkpoint, and resume the tuple flow. Furthermore, the JCP 114 may receive user requests from the streams debug controller 112A, 112B.

Figure 2A:
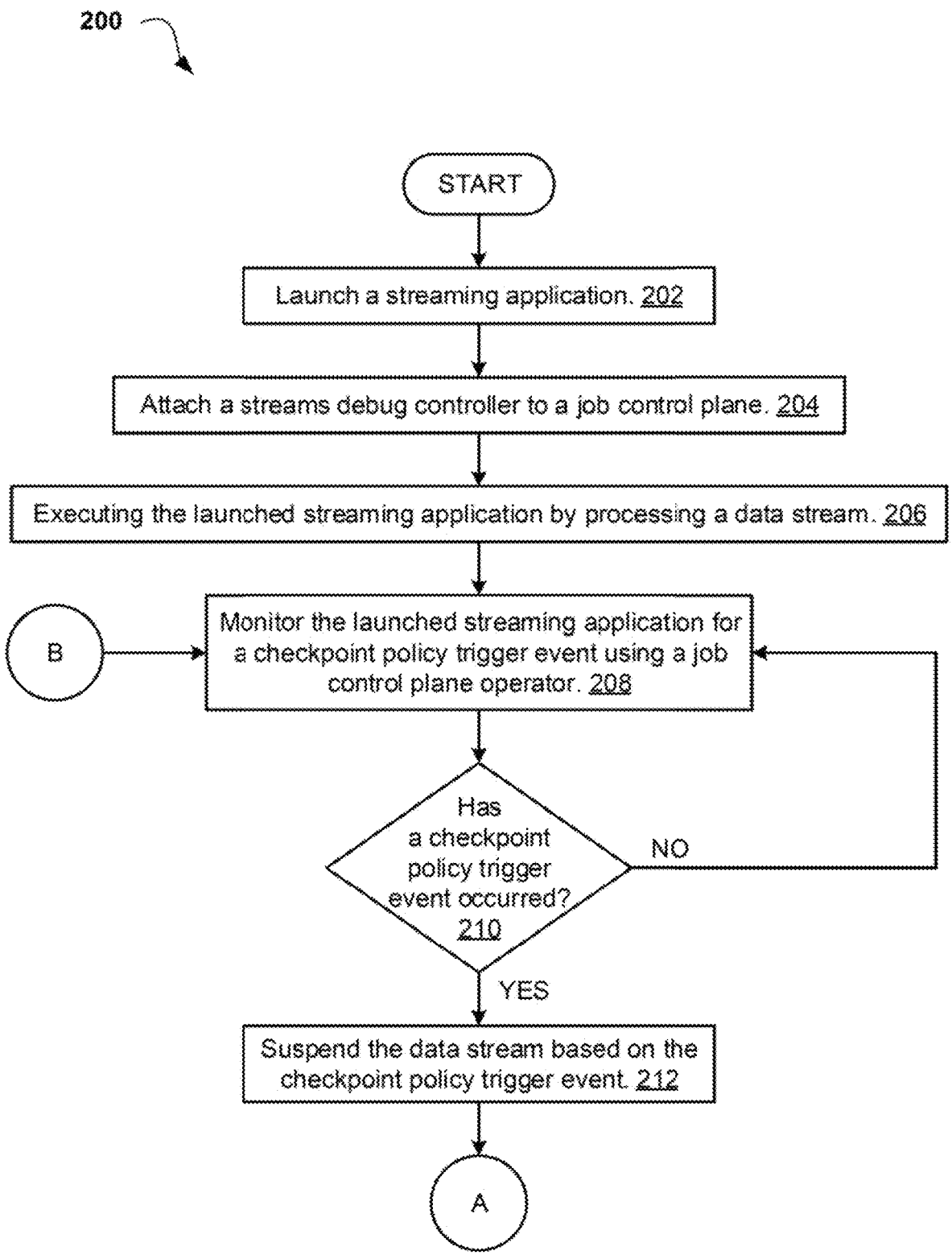
FIGS. 2A-2C illustrate an operational flowchart of a streaming application debugging process according to at least one embodiment.
Figure 2B:
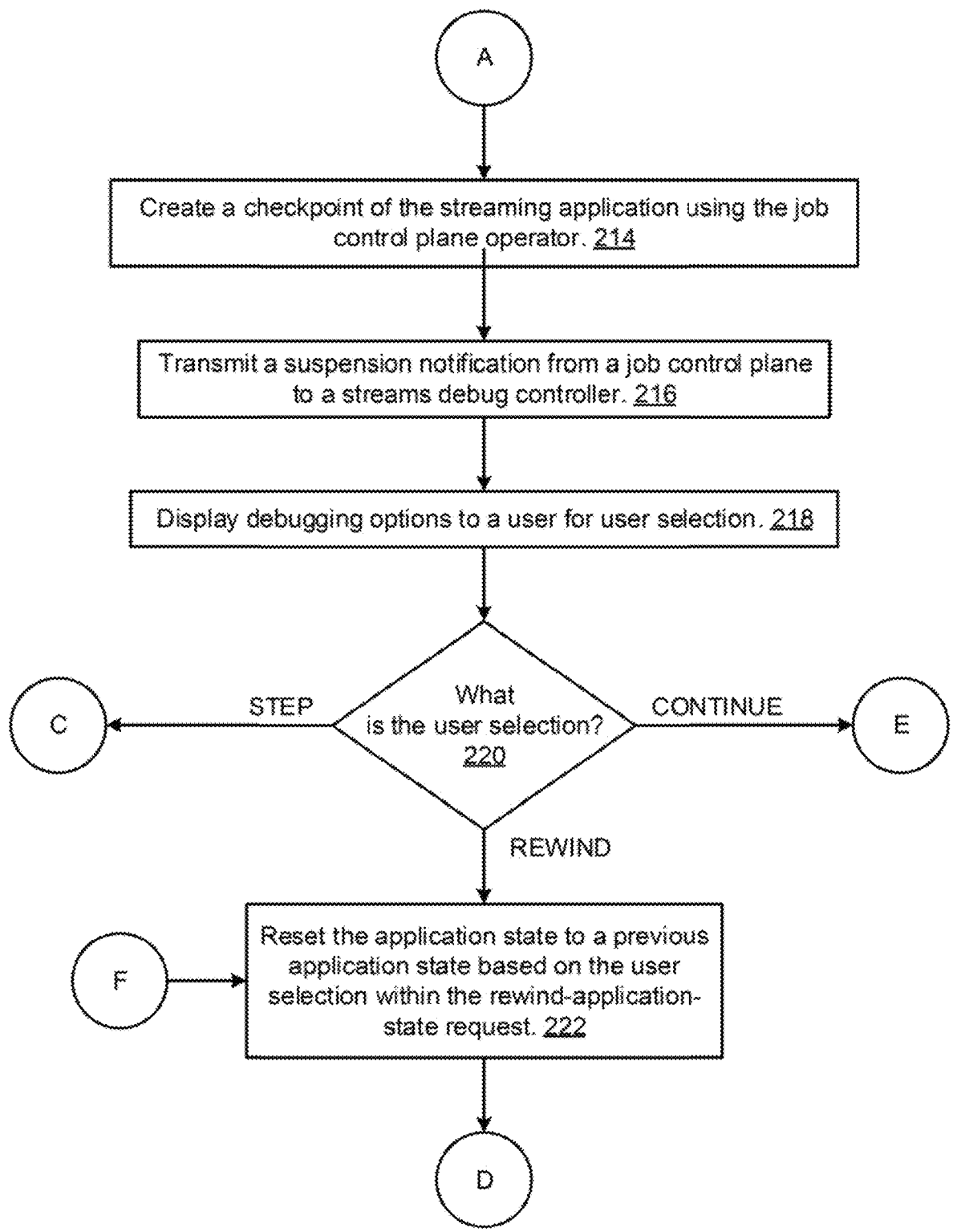
Figure 2C:
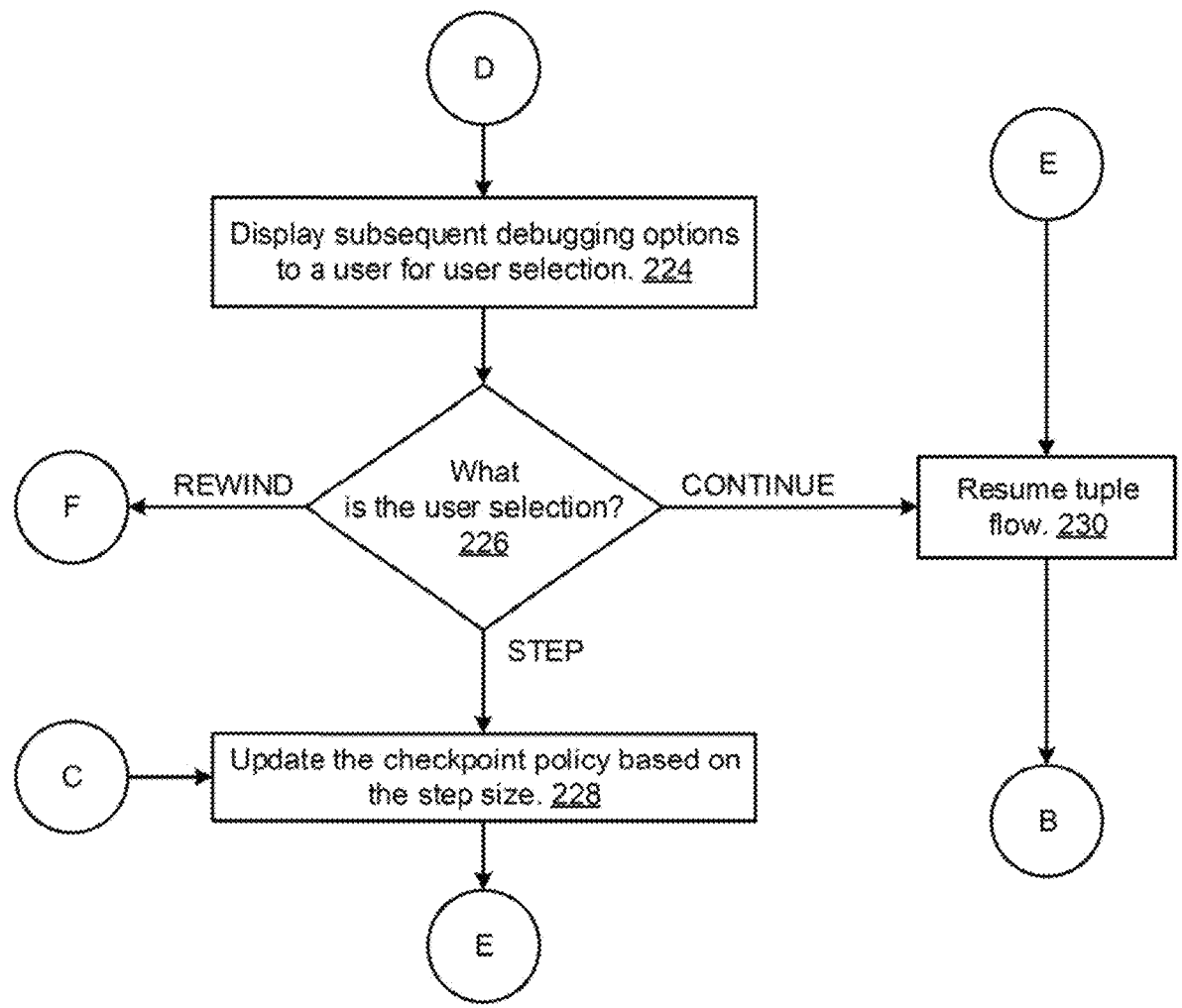

Referring now to FIGS. 2A-2C, an operational flowchart of a streaming application debugging process 200 is depicted, according to at least one embodiment. In FIG. 2A, at 202, a streaming application 116 (FIG. 1) is launched. The streaming application 116 (FIG. 1) requiring debugging may be launched through user action on a graphical user interface associated with the client computing device 110 (FIG. 1) or by an executed script or operator. For example, a user may initiate the streaming application 116 (FIG. 1) by submitting a job request to a streams runtime.

Next, at 204, the streams debug controller 112A, 112B (FIG. 1) is attached (e.g. communicatively connected) to the JCP 114 (FIG. 1). Since the JCP 114 (FIG. 1) may have a preexisting connection with the launched streaming application 116 (FIG. 1), creating a communication connection between the streams debug controller 112A, 112B (FIG. 1) and the JCP 114 (FIG. 1) during initial setup of the launched streaming application 116 (FIG. 1) may allow the JCP 114 (FIG. 1) to notify the streams debug controller 112A, 112B (FIG. 1) of an event occurring within the launched streaming application 116 (FIG. 1) that may require action. Furthermore, the communication connection via the network 130 (FIG. 1) may be established through known connection techniques, such as a debugging engine using transmission control protocol.

Then, at 206, the streaming application 116 (FIG. 1) executes by processing data within a data stream. The data stream may include data elements, or tuples, used by the streaming application 116 (FIG. 1) to perform primary functions. As previously described, a tuple may relate to a finite ordered set of values passed as a string of data from one program to another. Additionally, processing the data stream by the streaming application 116 (FIG. 1) may include receiving and transmitting tuples. For example, if the streaming application 116 (FIG. 1) is related to social media, the streaming application 116 (FIG. 1) may receive and transmit information related to user profiles, such as images and text.

Next, at 208, the JCP 114 (FIG. 1) monitors the streaming application 116 (FIG. 1) for an event that triggers a checkpoint. During execution, the JCP 114 (FIG. 1) may analyze each processing element of the streaming application 116 (FIG. 1) to determine whether the checkpoint policy is satisfied and a checkpoint of the streaming application 116 (FIG. 1) should be established. As previously described, a checkpoint may relate to a cycle within the streaming application 116 (FIG. 1) where tuples are drained (e.g. a cache is emptied or flushed), the application state is stored, and the application will be suspended throughout a consistent region. A checkpoint policy may relate to the circumstances under which the JCP 114 (FIG. 1) will establish a checkpoint of the streaming application 116 (FIG. 1). Various types of checkpoint policies may exist, such as a time-based checkpoint policy, an operator-driven checkpoint policy, or a count-based checkpoint policy. A time-based checkpoint policy may relate to a checkpoint policy controlled on a user-defined time-based frequency. For example, a user may configure the checkpoint policy to create a checkpoint every minute. An operator-driven checkpoint policy may relate to a checkpoint policy controlled by the source operator in a consistent region. For example, if a user is reading files within a directory, the operator-driven checkpoint policy may be written to require a checkpoint be established after each file within the directory is read. A count-based checkpoint policy may relate to a checkpoint policy controlled by the amount or total number of data processed. For example, a user may configure the checkpoint policy to create a checkpoint after every 100 tuples of data are processed. Additionally, the checkpoint policy may be changed or updated, dynamically, at runtime. Furthermore, the checkpoint policy may be capable of performing a checkpoint of the streaming application 116 (FIG. 1) on-demand based on user selection.

Then, at 210, the JCP 114 (FIG. 1) determines whether a checkpoint policy trigger event has occurred. According to one implementation, the streaming application debugging process 200 may continue along the operational flowchart, if a checkpoint policy trigger event occurs. A checkpoint policy trigger event may occur if an event transpires within the streaming application 116 (FIG. 1) that satisfies the requirements of the checkpoint policy. For example, under a count-based checkpoint policy preconfigured to create a checkpoint after 100 tuples have been processed, the JCP 114 (FIG. 1) may determine a checkpoint policy trigger event has occurred after the $100^{th}$ tuple has been processed. If the JCP 114 (FIG. 1) determines a checkpoint policy trigger event has occurred (step 210, "Yes" branch), the streaming application debugging process 200 may continue to step 212 to allow the JCP 114 (FIG. 1) to suspend the tuple flow of the debug region and create a checkpoint of the streaming application 116 (FIG. 1). If the JCP 114 (FIG. 1) determines a checkpoint policy trigger event has not occurred (step 210, "No" branch), the streaming application debugging process 200 may return to step 208 to monitor the streaming application 116 (FIG. 1) for an event that triggers the checkpoint policy.

Next, at 212, the JCP 114 (FIG. 1) suspends the tuple flow. Upon determining a checkpoint policy trigger event has occurred in the streaming application 116 (FIG. 1) at step 210, the JCP 114 (FIG. 1) may suspend the tuple flow of the streaming application 116 (FIG. 1) in the debug region to allow a user to debug the streaming application 116 (FIG. 1) by utilizing the streams debug controller 112A, 112B (FIG. 1).

Referring now to FIG. 2B, at 214, the JCP 114 (FIG. 1) creates a checkpoint of the streaming application 116 (FIG. 1). As previously described, a checkpoint may relate to a cycle within the streaming application 116 (FIG. 1) where tuples are drained, the application state is stored, and the application will be suspended throughout a debug region. For example, if the checkpoint policy is configured to establish a checkpoint after every 1,000 tuples are processed, the JCP 114 (FIG. 1) may drain the tuples within memory and save the application state when the JCP 114 (FIG. 1) determines 1,000 tuples have been processed since the last checkpoint.

Then, at 216, the JCP 114 (FIG. 1) transmits a suspension notification to the streams debug controller 112A, 112B (FIG. 1). Upon creation of a checkpoint at the suspension of the tuple flow of the streaming application 116 (FIG. 1) at step 214, the JCP 114 (FIG. 1) may transmit a notification detailing the application state of the streaming application 116 (FIG. 1) to the streams debug controller 112A, 112B (FIG. 1).

Next, at 218, the streams debug controller 112A, 112B (FIG. 1) displays debugging options to a user for user selection. Upon receiving notification of the suspension of the tuple flow within the streaming application 116 (FIG. 1), the streams debug controller 112A, 112B (FIG. 1) may display debugging options to a user through a graphical user interface. The user may interact with the graphical user interface to select a user-preferred debugging option with which the user wishes to proceed. The debugging options presented to the user by the streams debug controller 112A, 112B (FIG. 1) may include continuing the tuple flow of the streaming application 116 (FIG. 1) until another checkpoint policy trigger event is observed, rewinding the application state to a previous checkpoint, and stepping the tuple flow of the streaming application 116 (FIG. 1) forward by a user-specified number of tuples.

Then, at 220, the streams debug controller 112A, 112B (FIG. 1) determines which debugging option the user has selected. According to one implementation, the streaming application debugging process 200 may continue along the operational flowchart based on which debugging option was selected by the user. The streams debug controller 112A, 112B (FIG. 1) may present a continue-monitoring option, a rewind-application-state option, and a step-n-tuples option within the graphical user interface from which the user may select. The continue-monitoring option may be selected when not enough information is available to debug the streaming application 116 (FIG. 1) or if the user wishes the streaming application 116 (FIG. 1) to continue operations under current settings. The rewind-application-state option may be selected to reset the application state of the streaming application 116 (FIG. 1) to a checkpoint prior to the occurrence of an error and replay the tuple flow from the prior checkpoint forward, which may aid in the debugging process since the user may view the tuple flow immediately preceding the error. The step-n-tuples option may be selected to play n-tuples forward before the debug region is suspended again in order for the user to observe the application processing a smaller set of the dataset. Furthermore, the streams debug controller 112A, 112B (FIG. 1) may perform specific functions depending on the user selection.

If the user selected to continue monitoring the streaming application 116 (FIG. 1) (step 220, "Continue" branch), the streams debug controller 112A, 112B (FIG. 1) may translate and transmit the user selection to the JCP 114 (FIG. 1) and the streaming application debugging process 200 may continue to step 230 to resume the tuple flow of the debug region. If the user selected to rewind the application state to a previous checkpoint (step 220, "Rewind" branch), the streams debug controller 112A, 112B (FIG. 1) may translate and transmit the user selection to the JCP 114 (FIG. 1) and the streaming application debugging process 200 may continue to step 222 to reset the current application state to a user-designated previous checkpoint. If the user selected to step the tuple flow of the streaming application 116 (FIG. 1) by a user-specified number of tuples (step 220, "Step" branch), the streams debug controller 112A, 112B (FIG. 1) may translate and transmit the user selection to the JCP 114 (FIG. 1) and the streaming application debugging process 200 may continue to step 228 to update the checkpoint policy based on the user-provided step size.

Prior to the streaming application debugging process 200 continuing to step 230 based on the user-selected debugging option to continue monitoring the streaming application 116 (FIG. 1), the streams debug controller 112A, 112B (FIG. 1) may translate the continue-monitoring user selection into a continue-monitoring request compatible with the JCP 114 (FIG. 1). The streams debug controller 112A, 112B (FIG. 1) may then transmit the continue-monitoring request to the JCP 114 (FIG. 1) for processing, which may instruct the JCP 114 (FIG. 1) to resume the tuple flow of the streaming application 116 (FIG. 1) under the existing checkpoint policy until a subsequent checkpoint policy trigger event.

Prior to the streaming application debugging process 200 continuing to step 228 based on the user-selected debugging option to step the tuple flow of the streaming application 116 (FIG. 1) by a user-specified number of tuples, the streams debug controller 112A, 112B (FIG. 1) may translate the step-n-tuples user selection into a step-n-tuples request compatible with the JCP 114 (FIG. 1). Prior to transmitting the step-n-tuples request to the JCP 114 (FIG. 1), the streams debug controller 112A, 112B (FIG. 1) may prompt the user to provide the number of tuples to step the data stream, or step size. For example, the user may choose to step the tuple flow incrementally by one tuple or n-tuples, where n is a whole integer. The user-specified step size may be included within the step-n-tuples request translated by the streams debug controller 112A, 112B (FIG. 1). Once the step size has been received and included within the step-n-tuples request, the streams debug controller 112A, 112B (FIG. 1) may transmit the step-n-tuples request to the JCP 114 (FIG. 1) for processing.

Prior to the streaming application debugging process 200 continuing to step 222 based on the user-selected debugging option to rewind the application state to a previous checkpoint, the streams debug controller 112A, 112B (FIG. 1) may translate the rewind-application-state user selection into a rewind-application-state request compatible with the JCP 114 (FIG. 1). Prior to transmitting the rewind-application-state request to the JCP 114 (FIG. 1), the streams debug controller 112A, 112B (FIG. 1) may prompt the user to identify the previous checkpoint to which the JCP 114 (FIG. 1) should rewind. The streams debug controller 112A, 112B (FIG. 1) may display a list of all available checkpoints on a graphical user interface from which the user may select. Upon receiving a user selection, the streams debug controller 112A, 112B (FIG. 1) may include the user selection in the rewind-application-state request to allow the JCP 114 (FIG. 1) to rewind the application state to the appropriate checkpoint.

If the user-selected debugging option is to rewind the application, then, at 222, the JCP 114 (FIG. 1) resets the application state of the streaming application 116 (FIG. 1) to a previous application state based on the user selection within the rewind-application-state request. When resetting the application state of the streaming application 116 (FIG. 1) to the user selection, the JCP 114 (FIG. 1) may instruct all operators, including the source operator, to reset the operator's internal state to the specified checkpoint.

In at least one embodiment, resetting the application state based on a previous checkpoint may allow the JCP 114 (FIG. 1) to replay the tuple flow of the streaming application 116 (FIG. 1) from the reset application state forward in time based on a user selection within a graphical user interface associated with the streams debug controller 112A, 112B (FIG. 1). Therefore, the user may be capable of identifying when the error occurred within the streaming application 116 (FIG. 1) and perform the necessary debugging action to remove the error. For example, a checkpoint may have been created immediately prior to the streaming application 116 (FIG. 1) processing tuple A, tuple B, and tuple C. After processing tuple A, tuple B, and tuple C, the streaming application 116 (FIG. 1) may have experienced an error. The rewind-application-state request may instruct the JCP 114 (FIG. 1) to reset the application state to the checkpoint stored prior to the processing of tuple A, tuple B, and tuple C. Once the JCP 114 (FIG. 1) has reset the application state of the streaming application 116 (FIG. 1) based on the previously stored checkpoint, the JCP 114 (FIG. 1) may replay the tuple flow thereby allowing the user to observe the processing of tuple A, tuple B, and tuple C.

In another embodiment, the JCP 114 (FIG. 1) may be capable of replacing tuples within the tuple flow with a user-provided tuple set thereby allowing the tuple flow to be replayed with the user-provided tuple set. For example, if the stored tuple flow to be replayed by the JCP 114 (FIG. 1) is tuple A followed by tuple B followed by tuple C, the streams debug controller 112A, 112B (FIG. 1) may be capable of instructing the JCP 114 (FIG. 1) to replace tuple A, tuple B, and tuple C, with user-provided tuples, such as tuple D, tuple E, and tuple F. The JCP 114 (FIG. 1) may then resume the tuple flow with the user-provided tuple set. To begin the process of replacing stored tuples within the tuple flow, the user may issue a replace-tuple-set request to the streams debug controller 112A, 112B (FIG. 1) based on a user selection on a graphical user interface associated with the streams debug controller 112A, 112B (FIG. 1). Upon receiving the replace-tuple-set request, the streams debug controller 112A, 112B (FIG. 1) may prompt the user to submit a tuple set with which to replace the stored tuple set. Furthermore, upon receiving the user-provided tuple set, the streams debug controller 112A, 112B (FIG. 1) may instruct the JCP 114 (FIG. 1) to clear the stored tuple set to allow space for the user-provided tuple set. The JCP 114 (FIG. 1) may then instruct the source operator to clear data within a cache and advance to the end of a data queue, which, effectively, discards any tuples to be replayed by the source operator. The JCP 114 (FIG. 1) may then insert the user-provided tuple set into the output port of the source operator. Thereafter, the streams debug controller 112A, 112B (FIG. 1) may instruct the JCP 114 (FIG. 1) to process the user-provided tuple set within the tuple flow. Furthermore, the JCP 114 (FIG. 1) may assume control of processing the tuple flow from the source operator until after the user-provided tuple set has been processed.

In yet another embodiment, the streams debug controller 112A, 112B (FIG. 1) may allow a user to insert new tuples and/or replace only a subset of existing tuples within the data flow based on user interaction with a graphical user interface associated with the client computing device 110 (FIG. 1). For example, in the previously described example, tuple G may be inserted between tuple D and tuple E such that the tuple flow processes tuple D, then tuple G, and then tuple E.

Referring now to FIG. 2C, at 224, the streams debug controller 112A, 112B (FIG. 1) displays subsequent debugging options to a user for user selection. Upon the JCP 114 (FIG. 1) successfully resetting the application state of the streaming application 116 (FIG. 1) to the user-selected checkpoint, the streams debug controller 112A, 112B (FIG. 1) may display more debugging options to a user through the graphical user interface. The user may interact with the graphical user interface to select a user-preferred debugging option with which the user wishes to proceed. The debugging options presented to the user by the streams debug controller 112A, 112B (FIG. 1) may include continuing the tuple flow of the streaming application 116 (FIG. 1) until another checkpoint policy trigger event is observed and stepping the tuple flow of the streaming application 116 (FIG. 1) by a user-specified number of tuples. The user selection may be based on whether the application state of the streaming application 116 (FIG. 1) is sufficient for adequately debugging the streaming application 116 (FIG. 1). For example, if the JCP 114 (FIG. 1) reset the application state to an earlier checkpoint than necessary, the user may select to continue the tuple flow until a subsequent stored checkpoint is reached. Similarly, if the JCP 114 (FIG. 1) reset the application to an appropriate checkpoint, the user may select to step the tuple flow incrementally until an error within the streaming application 116 (FIG. 1) is encountered so the user may correct the error.

Next, at 226, the streams debug controller 112A, 112B (FIG. 1) determines which subsequent debugging option the user selected. According to one implementation, the streaming application debugging process 200 may continue along the operational flowchart based on which subsequent debugging option was selected by the user. If the streams debug controller 112A, 112B (FIG. 1) presents a continue-monitoring option, a rewind-application-state option, and a step-n-tuples option, the user may select one of the presented options from the graphical user interface. The user may select the continue-monitoring option if the user wishes to continue the tuple flow of the streaming application 116 (FIG. 1), such as when not enough information is available to debug the streaming application 116 (FIG. 1) or if the user wishes the streaming application 116 (FIG. 1) to continue to a subsequent checkpoint policy trigger event. The user may select the step-n-tuples option to change the tuple flow in order to pinpoint the cause of the error within the streaming application 116 (FIG. 1). The user may select the rewind-application-state option to reset the application state of the streaming application 116 (FIG. 1) to a checkpoint prior to the occurrence of an error and replay the tuple flow from the prior checkpoint forward, which may aid in the debugging process since the user may view the tuple flow leading toward the error. Furthermore, the streams debug controller 112A, 112B (FIG. 1) may perform specific functions depending on the user selection. If the user selected to continue monitoring the streaming application 116 (FIG. 1) (step 226, "Continue" branch), the streams debug controller 112A, 112B (FIG. 1) may translate and transmit the user selection to the JCP 114 (FIG. 1) and the streaming application debugging process 200 may continue to step 230 to resume the tuple flow of the debug region. The streaming application debugging process 200 may then return to step 208 to monitor the launched streaming application 116 (FIG. 1) for a checkpoint policy trigger event. If the user selected to step the tuple flow of the streaming application 116 (FIG. 1) by a user-specified number of tuples (step 226, "Step" branch), the streams debug controller 112A, 112B (FIG. 1) may translate and transmit the user selection to the JCP 114 (FIG. 1) and the streaming application debugging process 200 may continue to step 228 to update the checkpoint policy based on the user-provided step size. If the user selected to rewind the application state to a previous checkpoint (step 226, "Rewind" branch), the streams debug controller 112A, 112B (FIG. 1) may translate and transmit the user selection to the JCP 114 (FIG. 1) and the streaming application debugging process 200 may return to step 222 to reset the current application state to a user-designated previous checkpoint.

Prior to the streaming application debugging process 200 continuing to step 230 to resume the tuple flow based on the user-selected subsequent debugging option to continue monitoring the streaming application 116 (FIG. 1), the streams debug controller 112A, 112B (FIG. 1) may translate the continue-monitoring user selection into a continue-monitoring request compatible with the JCP 114 (FIG. 1). The streams debug controller 112A, 112B (FIG. 1) may then transmit the continue-monitoring request to the JCP 114 (FIG. 1) for processing, which may instruct the JCP 114 (FIG. 1) to resume the tuple flow of the streaming application 116 (FIG. 1) under the existing checkpoint policy until a subsequent checkpoint policy trigger event occurs.

Prior to the streaming application debugging process 200 continuing to step 228 based on the user-selected subsequent debugging option to step the tuple flow of the streaming application 116 (FIG. 1) by a user-specified number of tuples, the streams debug controller 112A, 112B (FIG. 1) may translate the step-n-tuples user selection into a step-n-tuples request understandable by the JCP 114 (FIG. 1). Prior to transmitting the step-n-tuples request to the JCP 114 (FIG. 1), the streams debug controller 112A, 112B (FIG. 1) may prompt the user to provide the step size. For example, the user may choose to step the tuple flow incrementally by one tuple or n-tuples where n is a whole integer. The user-specified step size may be included within the step-n-tuples request translated by the streams debug controller 112A, 112B (FIG. 1). The streams debug controller 112A, 112B (FIG. 1) may transmit the step-n-tuples request to the JCP 114 (FIG. 1) for processing.

Then, at 228, the JCP 114 (FIG. 1) updates the checkpoint policy based on the user-specified step size within the step-n-tuples request. Once the checkpoint policy is updated, the JCP 114 (FIG. 1) may instruct the streaming application 116 (FIG. 1) to resume processing tuples until a subsequent checkpoint policy event is triggered for the streaming application 116 (FIG. 1) for the period specified within the updated checkpoint policy. For example, if the user-specified step size is 100 tuples, the JCP 114 (FIG. 1) may resume the tuple flow at 230 and continue to monitor the streaming application 116 (FIG. 1) in accordance with step 208. Since the checkpoint policy is updated to the user-specified step size of 100 tuples, the JCP 114 (FIG. 1) may determine a checkpoint policy trigger event has occurred once 100 tuples have been processed by the streaming application 116 (FIG. 1). Additionally, when updating the checkpoint policy, the JCP 114 (FIG. 1) may change the type of checkpoint policy in order to accommodate the user-specified step size. For example, if the checkpoint policy is configured to create a checkpoint every two minutes and the user-specified step size is set to increment the tuple flow by 100 tuples, then the JCP 114 (FIG. 1) may be required to change the type of checkpoint policy from time-based to count-based in order to accommodate the user-specified step size.

If the user-selected debugging option or the subsequent user-selected debugging option is to continue the tuple flow, then, at step 230, the JCP 114 (FIG. 1) resumes the tuple flow to the debug region of the streaming application 116 (FIG. 1). As previously described, resuming the tuple flow to the debug region of the streaming application 116 (FIG. 1) may allow a user to advance the tuple flow until the next checkpoint policy trigger event, which may allow the user to observe an occurrence of a program error or system error in need of debugging. Once the tuple flow has been resumed, the streaming application debugging process 200 may return to step 208 to monitor the launched streaming application 116 (FIG. 1) for a checkpoint policy trigger event.

Figure 3:
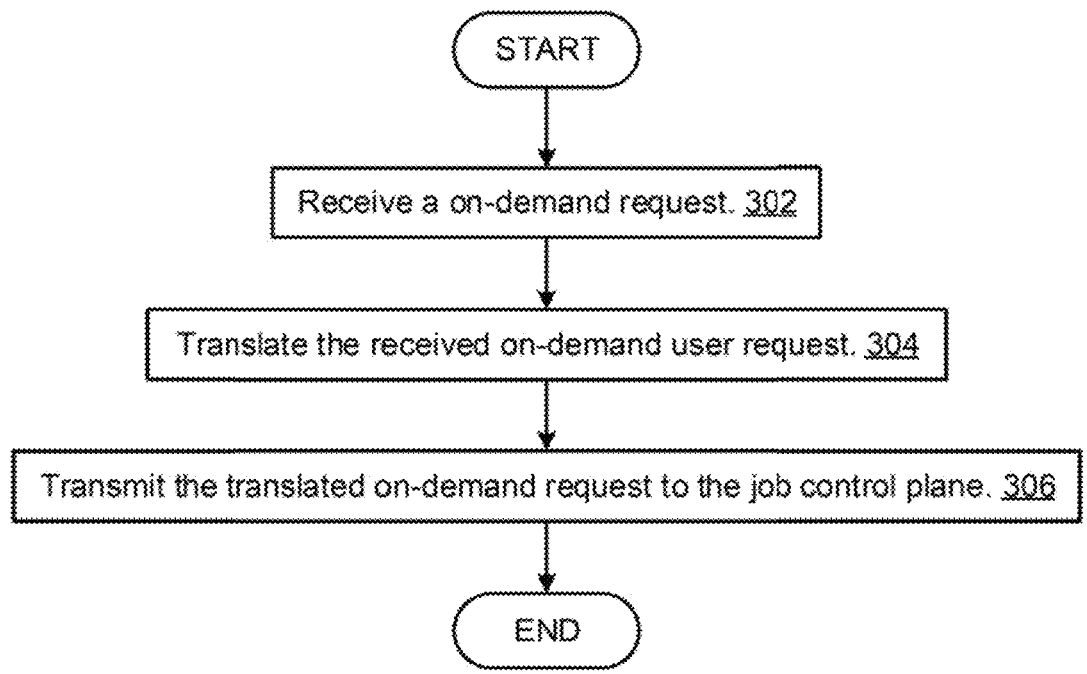
FIG. 3 is an operational flowchart of an on-demand user request process according to at least one embodiment.

Referring now to FIG. 3, an operational flowchart of an on-demand user request process 300 is depicted, according to at least one embodiment. At 302, the streams debug controller 112A, 112B (FIG. 1) receives an on-demand user request from a user. The on-demand request received by the streams debug controller 112A, 112B (FIG. 1) may include an on-demand checkpoint request. An on-demand checkpoint request may be a user-submitted request for the JCP 114 (FIG. 1) to create a checkpoint of the streaming application 116 (FIG. 1) at the time the request was submitted. Furthermore, the received on-demand checkpoint request may be submitted to the streams debug controller 112A, 112B (FIG. 1) by a user interacting with a graphical user interface on the client computing device 110 (FIG. 1).

Next, at 304, the streams debug controller 112A, 112B (FIG. 1) translates the received on-demand user request. Since the JCP 114 (FIG. 1) may not be capable of understanding the on-demand user request in the received format, the streams debug controller 112A, 112B (FIG. 1) may translate the on-demand user request to a format understandable by the JCP 114 (FIG. 1) to allow the on-demand user request to be processed.

Then, at 306, the streams debug controller 112A, 112B (FIG. 1) transmits the translated on-demand user request to the JCP 114 (FIG. 1). Once the on-demand user request has been translated by the streams debug controller 112A, 112B (FIG. 1) so that the JCP 114 (FIG. 1) is capable of processing the on-demand user request, the streams debug controller 112A, 112B (FIG. 1) may transmit the on-demand user request to the JCP 114 (FIG. 1) for processing. Upon receiving the on-demand user request, the JCP 114 (FIG. 1) may proceed to update the checkpoint policy.

Figure 4:
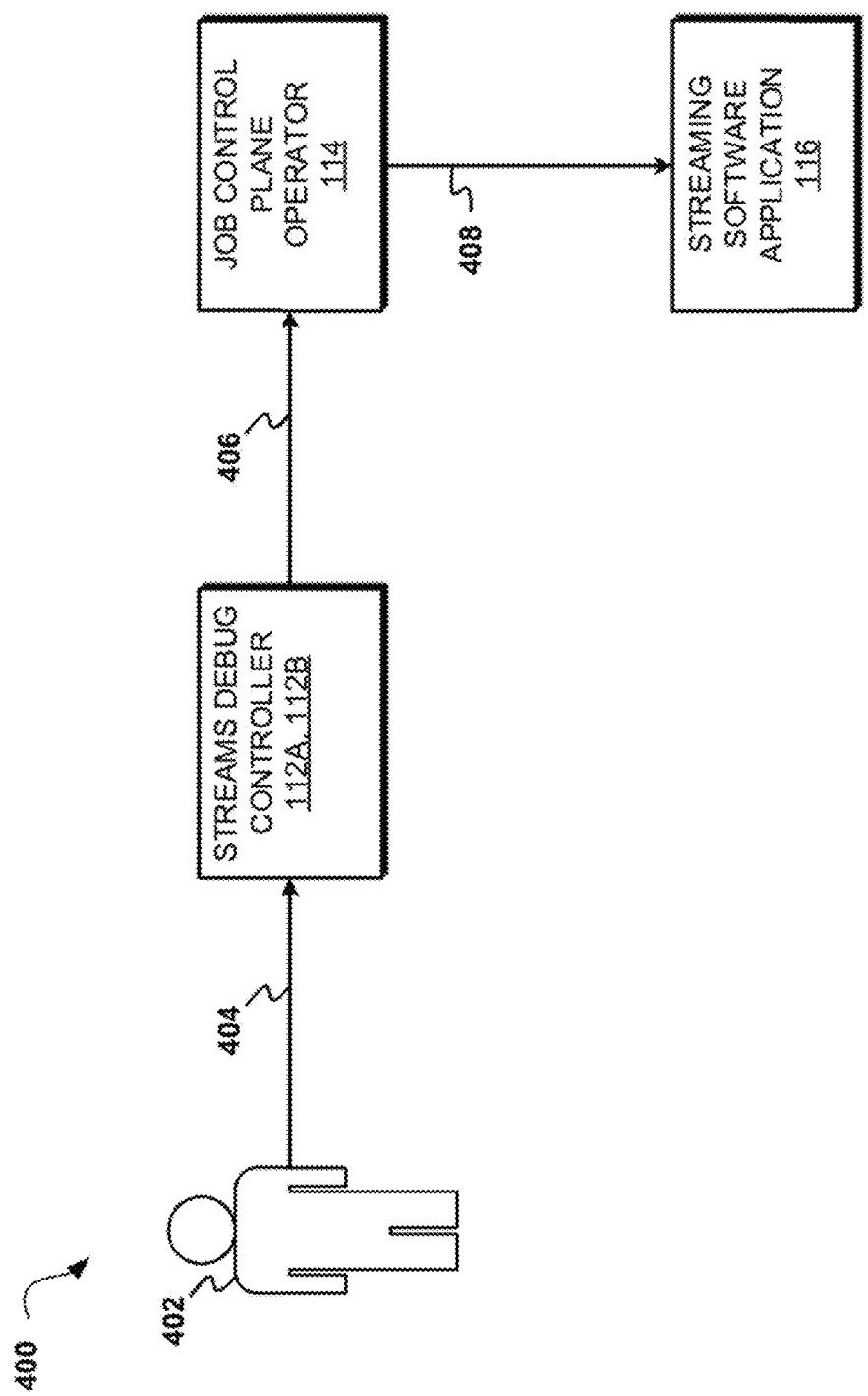
FIG. 4 is a block diagram of a streaming application debugger configuration according to at least one embodiment.

Referring now to FIG. 4, a block diagram of a streaming application debugger configuration 400 is depicted, according to at least one embodiment. At 404, a user 402 may interact with the streams debug controller 112A, 112B through a graphical user interface. The graphical user interface associated with the streams debug controller 112A, 112B may allow the user 402 to submit various requests to the streams debug controller 112A, 112B that correspond to various actions the user 402 wishes to implement on a streaming software application 116, such as a checkpoint request, a continue-monitoring request, a step-n-tuples request, a suspend-tuple-flow request, and a rewind-application-state request. Furthermore, the streams debug controller 112A, 112B may translate the user-submitted request into a format compatible with the JCP 114. At 406, once the user-submitted request has been translated into a compatible format associated with the JCP 114, the streams debug controller 112A, 112B may transmit the user-submitted request to the JCP 114. At 408, upon receiving the transmitted user-submitted request, the JCP 114 may process the user-submitted request by manipulating the tuple flow or state of the streaming software application 116 accordingly. For example, if the user-submitted request instructs the JCP 114 to create a checkpoint of the streaming software application 116, then the JCP 114 may drain tuples within the streaming software application 116 to achieve a consistent application state, store the application state, and suspend the tuple flow throughout the debug region of the streaming software application 116.

It may be appreciated that FIGS. 2-4 provide only an illustration of one embodiment and do not imply any limitations with regard to how different embodiments may be implemented. Many modifications to the depicted embodiment(s) may be made based on design and implementation requirements.

Figure 5:
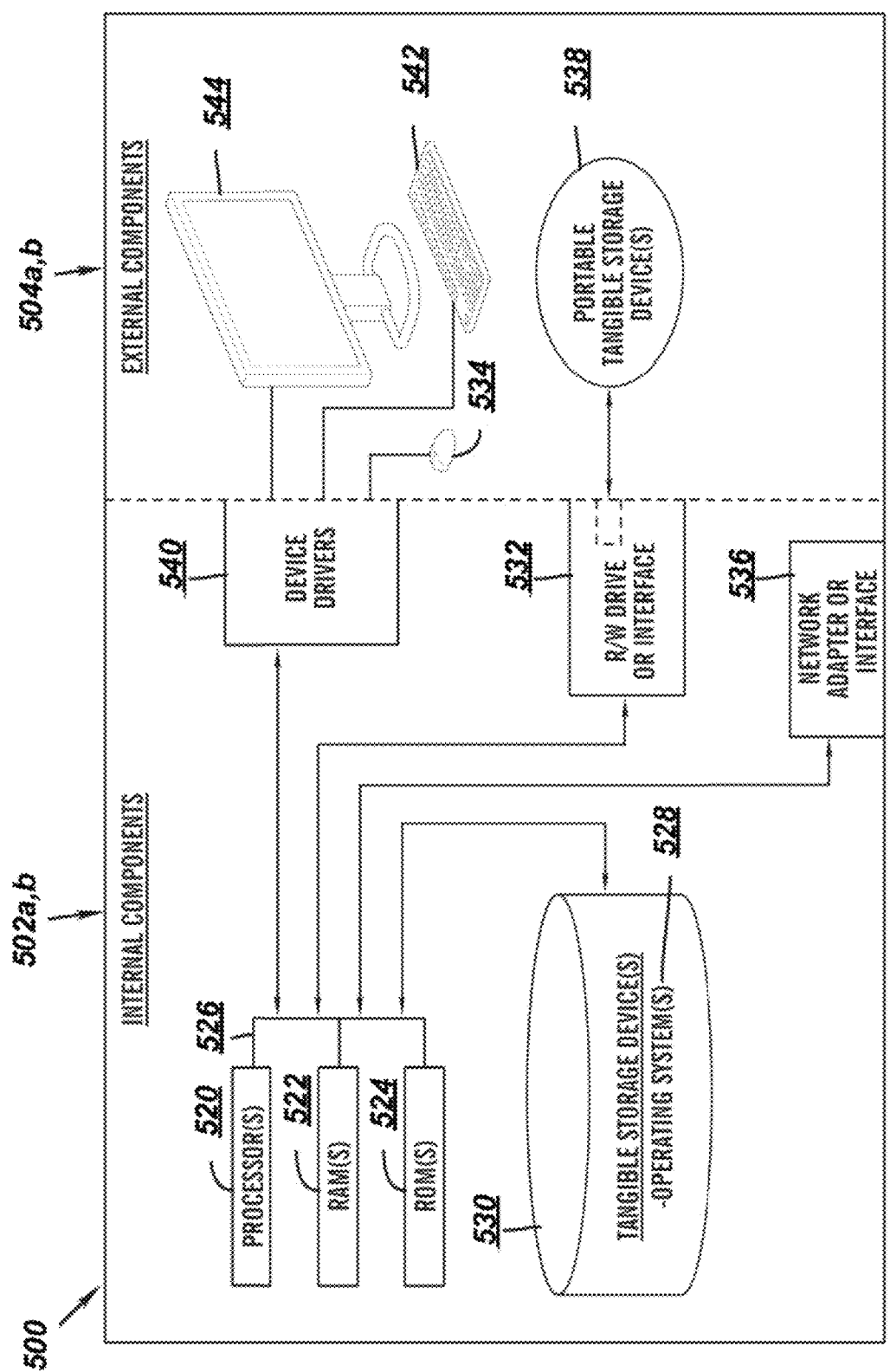
FIG. 5 is a block diagram of internal and external components of computers and servers depicted in FIG. 1 according to at least one embodiment.

FIG. 5 is a block diagram 500 of internal and external components of the client computing device 110 and the server 120 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 110 (FIG. 1) and the server 120 (FIG. 1) may include respective sets of internal components 502a,b and external components 504a,b illustrated in FIG. 5. Each of the sets of internal components 502 include one or more processors 520, one or more computer-readable RAMs 522 and one or more computer-readable ROMs 524 on one or more buses 526, and one or more operating systems 528 and one or more computer-readable tangible storage devices 530. The one or more operating systems 528, the software program 108 (FIG. 1) and streams debug controller 112A (FIG. 1) in the client computing device 110 (FIG. 1), and the streams debug controller 112B (FIG. 1), the JCP 114 (FIG. 1), and the streaming application 116 (FIG. 1) in the server 120 (FIG. 1) are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the streams debug controller 112A, 112B (FIG. 1), can be stored on one or more of the respective portable computer-readable tangible storage devices 538, read via the respective R/W drive or interface 532 and loaded into the respective hard drive 530.

Each set of internal components 502a,b also includes network adapters or interfaces 536 such as a TCP/IP adapter cards, wireless Wi-Fi interface cards, or 3G or 4G wireless interface cards or other wired or wireless communication links. The software program 108 (FIG. 1) and streams debug controller 112A (FIG. 1) in the client computing device 110 (FIG. 1), and the streams debug controller 112B (FIG. 1), the JCP 114 (FIG. 1), and the streaming application 116 (FIG. 1) in the server 120 (FIG. 1) can be downloaded to the client computing device 110 (FIG. 1) and the server 120 (FIG. 1) from an external computer via a network (for example, the Internet, a local area network or other, wide area network) and respective network adapters or interfaces 536. From the network adapters or interfaces 536, the software program 108 (FIG. 1) and the streams debug controller 112A (FIG. 1) in the client computing device 110 (FIG. 1), and the streams debug controller 112B (FIG. 1), the JCP 114 (FIG. 1), and the streaming application 116 (FIG. 1) in the server 120 (FIG. 1) are loaded into the respective hard drive 530. The network may comprise copper wires, optical fibers, wireless transmission, routers, firewalls, switches, gateway computers and/or edge servers.

Each of the sets of external components 504a,b can include a computer display monitor 544, a keyboard 542, and a computer mouse 534. External components 504a,b can also include touch screens, virtual keyboards, touch pads, pointing devices, and other human interface devices. Each of the sets of internal components 502a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
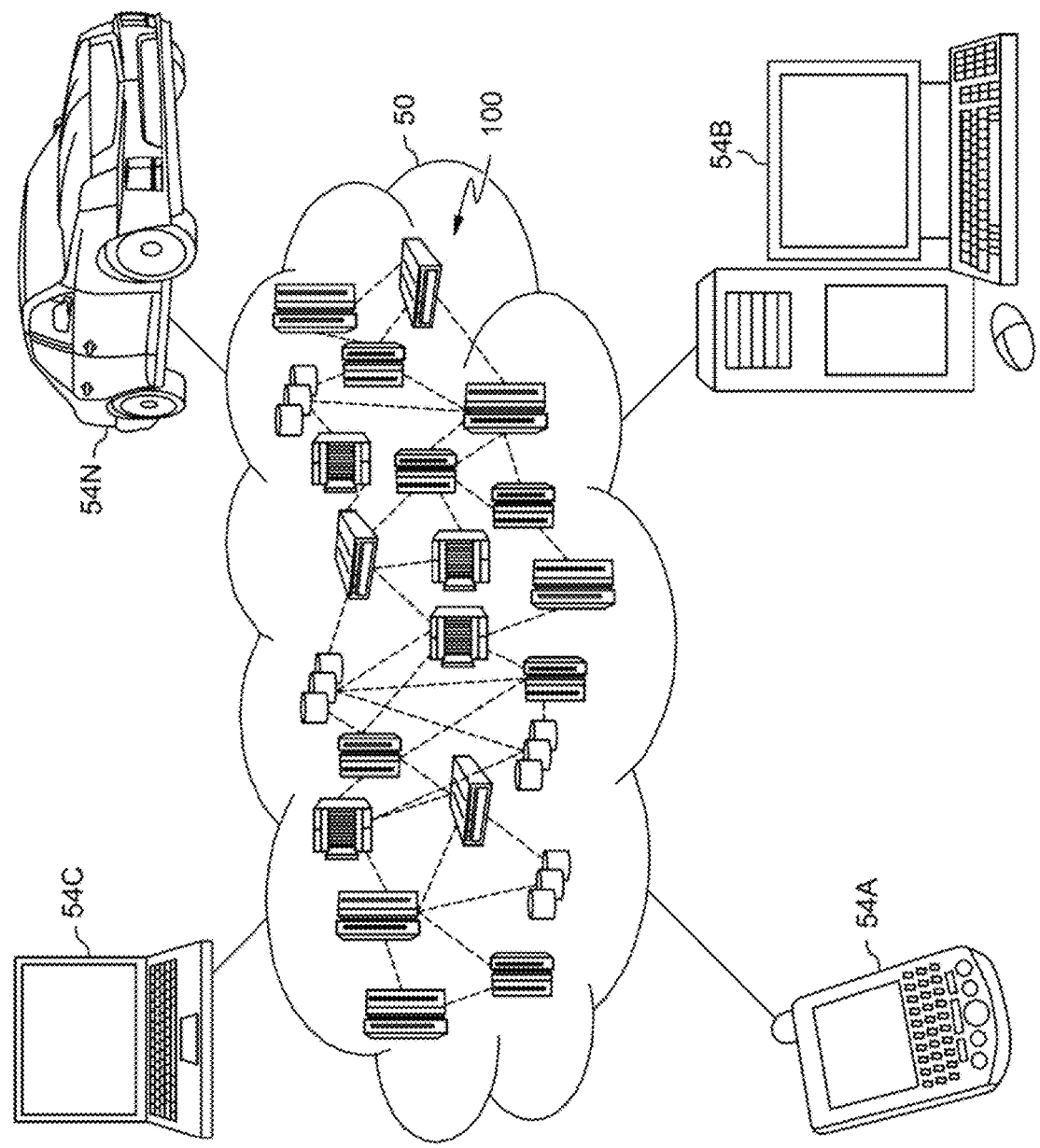
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
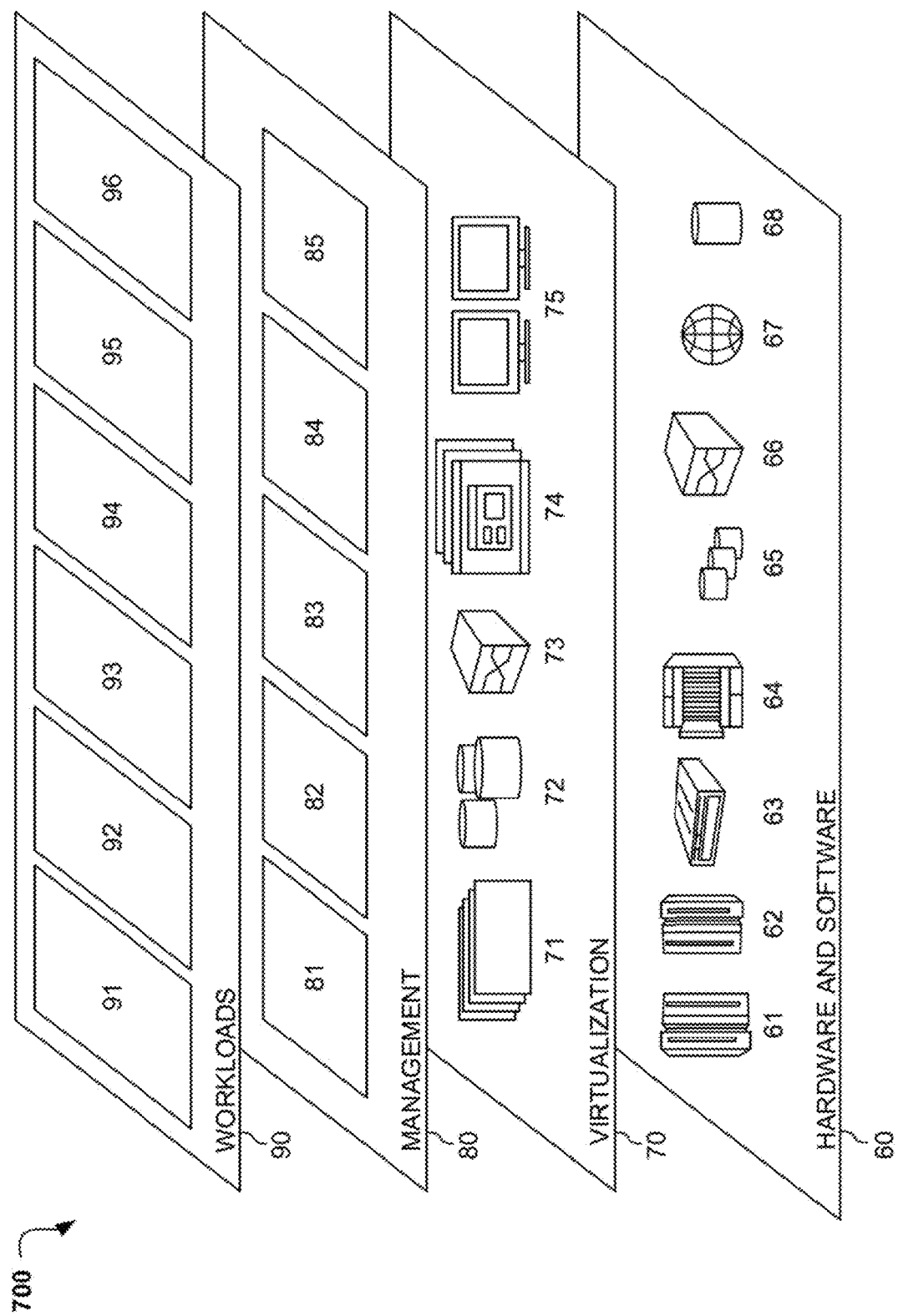
FIG. 7 depicts abstraction model layers according to an embodiment of the present invention.

Referring now to FIG. 7 a set of functional abstraction layers 700 provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and streaming application debugging 96. Streaming application debugging 96 provides the capability to attach a debugger to a job control plane in order to translate user debugging requests. The translated user debugging requests may be understandable by the job control plane thereby allowing the user to manipulate the tuple flow of a streaming application to aid in the debugging process.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for debugging a streaming application, the method comprising:

establishing a debug region in the streaming application to mark a subgraph for debugging, wherein the debug region is an extension of a consistent region;

determining a debugging option for debugging the debug region in the streaming application from a displayed plurality of debugging options based on a user selection on a graphical user interface;

translating the determined debugging option into a format compatible with a job control plane;

transmitting the translated debugging option to the job control plane; determining the transmitted debugging option is a continue-monitoring request;

resuming a tuple flow using the job control plane based on the continue-monitoring request;

determining a checkpoint policy trigger event has occurred based on a preconfigured checkpoint policy, wherein the preconfigured checkpoint policy is an operator-driven checkpoint policy, and wherein the checkpoint policy trigger event relates to a source operator being read in the consistent region; and suspending the resumed tuple flow based on the determined checkpoint policy trigger event.

2. The method of claim 1, wherein the displayed plurality of debugging options comprises a checkpoint request, the continue-monitoring request, a step-n-tuples request, a suspend-tuple-flow request, a reduce-tuple-flow request, and a rewind-application-state request.

3. The method of claim 2, further comprising:

determining the debugging option is the step-n-tuples request;

requesting a step size from a user based on determining the debugging option is the step-n-tuples request;

receiving the requested step size based on a step size user selection;

updating a checkpoint policy based on the received step size;

resuming the tuple flow using the job control plane based on the updated checkpoint policy;

monitoring the resumed tuple flow for the checkpoint policy trigger event;

determining the checkpoint policy trigger event has occurred based on the updated checkpoint policy; and suspending the resumed tuple flow based on the determined checkpoint policy trigger event.

4. The method of claim 1, further comprising:

determining the debugging option is a rewind-application-state request;

displaying a plurality of previous checkpoints on the graphical user interface based on determining the determined debugging option is the rewind-application-state request, wherein the displayed plurality of previous checkpoints correspond to a plurality of previous application states of the streaming application;

identifying a previous checkpoint within the displayed plurality of previous checkpoints based on a previous checkpoint user selection;

resetting an application state associated with the streaming application based on the identified previous checkpoint; and resuming the tuple flow of the streaming application from the identified previous checkpoint.

5. The method of claim 4, further comprising:

receiving a plurality of injection tuples from a user; and injecting the received plurality of injection tuples into the tuple flow.

6. The method of claim 4, further comprising:

receiving a plurality of replacement tuples from a user; and replacing a plurality of stored tuples from the tuple flow with the received plurality of replacement tuples.

7. The method of claim 2, further comprising:

in response to the determined debugging option being a rewind-application-state request, instructing, by the job control plane, all operators to reset an internal state of each operator to a specified checkpoint, wherein the operators comprise the source operator.

8. A computer system for debugging a streaming application, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

establishing a debug region in the streaming application to mark a subgraph for debugging, wherein the debug region is an extension of a consistent region;

determining a debugging option for debugging the debug region in the streaming application from a displayed plurality of debugging options based on a user selection on a graphical user interface;

translating the determined debugging option into a format compatible with a job control plane;

transmitting the translated debugging option to the job control plane;

determining the transmitted debugging option is a continue-monitoring request;

resuming a tuple flow using the job control plane based on the continue-monitoring request;

determining a checkpoint policy trigger event has occurred based on a preconfigured checkpoint policy, wherein the preconfigured checkpoint policy is an operator-driven checkpoint policy, and wherein the checkpoint policy trigger event relates to a source operator being read in the consistent region; and suspending the resumed tuple flow based on the determined checkpoint policy trigger event.

9. The computer system of claim 8, wherein the displayed plurality of debugging options comprises a checkpoint request, the continue-monitoring request, a step-n-tuples request, a suspend-tuple-flow request, a reduce-tuple-flow request, and a rewind-application-state request.

10. The computer system of claim 9, further comprising:

determining the debugging option is the step-n-tuples request;

requesting a step size from a user based on determining the debugging option is the step-n-tuples request;

receiving the requested step size based on a step size user selection;

updating a checkpoint policy based on the received step size;

resuming the tuple flow using the job control plane based on the updated checkpoint policy;

monitoring the resumed tuple flow for the checkpoint policy trigger event;

determining the checkpoint policy trigger event has occurred based on the updated checkpoint policy; and suspending the resumed tuple flow based on the determined checkpoint policy trigger event.

11. The computer system of claim 8, further comprising:

determining the debugging option is a rewind-application-state request;

displaying a plurality of previous checkpoints on the graphical user interface based on determining the determined debugging option is the rewind-application-state request, wherein the displayed plurality of previous checkpoints correspond to a plurality of previous application states of the streaming application;

identifying a previous checkpoint within the displayed plurality of previous checkpoints based on a previous checkpoint user selection;

resetting an application state associated with the streaming application based on the identified previous checkpoint; and resuming the tuple flow of the streaming application from the identified previous checkpoint.

12. The computer system of claim 11, further comprising:

receiving a plurality of injection tuples from a user; and injecting the received plurality of injection tuples into the tuple flow.

13. The computer system of claim 11, further comprising:

receiving a plurality of replacement tuples from a user; and replacing a plurality of stored tuples from the tuple flow with the received plurality of replacement tuples.

14. The computer system of claim 9, further comprising:

in response to the determined debugging option being a rewind-application-state request, instructing, by the job control plane, all operators to reset an internal state of each operator to a specified checkpoint, wherein the operators comprise the source operator.

15. A computer program product for debugging a streaming application, the computer program product comprising:

one or more computer-readable tangible storage medium and program instructions stored on at least one of the one or more tangible storage medium, the program instructions executable by a processor capable of performing a method, the method comprising:

establishing a debug region in the streaming application to mark a subgraph for debugging, wherein the debug region is an extension of a consistent region;

determining a debugging option for debugging the debug region in the streaming application from a displayed plurality of debugging options based on a user selection on a graphical user interface;

translating the determined debugging option into a format compatible with a job control plane;

transmitting the translated debugging option to the job control plane;

determining the transmitted debugging option is a continue-monitoring request;

resuming a tuple flow using the job control plane based on the continue-monitoring request;

determining a checkpoint policy trigger event has occurred based on a preconfigured checkpoint policy, wherein the preconfigured checkpoint policy is an operator-driven checkpoint policy, and wherein the checkpoint policy trigger event relates to a source operator being read in the consistent region; and suspending the resumed tuple flow based on the determined checkpoint policy trigger event.

16. The computer program product of claim 15, wherein the displayed plurality of debugging options comprises a checkpoint request, the continue-monitoring request, a step-n-tuples request, a suspend-tuple-flow request, a reduce-tuple-flow request, and a rewind-application-state request.

17. The computer program product of claim 16, further comprising:

determining the debugging option is the step-n-tuples request;

requesting a step size from a user based on determining the debugging option is the step-n-tuples request;

receiving the requested step size based on a step size user selection;

updating a checkpoint policy based on the received step size;

resuming the tuple flow using the job control plane based on the updated checkpoint policy;

monitoring the resumed tuple flow for the checkpoint policy trigger event;

determining the checkpoint policy trigger event has occurred based on the updated checkpoint policy; and suspending the resumed tuple flow based on the determined checkpoint policy trigger event.

18. The computer program product of claim 15, further comprising:

determining the debugging option is a rewind-application-state request;

displaying a plurality of previous checkpoints on the graphical user interface based on determining the determined debugging option is the rewind-application-state request, wherein the displayed plurality of previous checkpoints correspond to a plurality of previous application states of the streaming application;

identifying a previous checkpoint within the displayed plurality of previous checkpoints based on a previous checkpoint user selection;

resetting an application state associated with the streaming application based on the identified previous checkpoint; and resuming the tuple flow of the streaming application from the identified previous checkpoint.

19. The computer program product of claim 18, further comprising:

receiving a plurality of injection tuples from a user; and injecting the received plurality of injection tuples into the tuple flow.

20. The computer program product of claim 18, further comprising:

receiving a plurality of replacement tuples from a user; and replacing a plurality of stored tuples from the tuple flow with the received plurality of replacement tuples.

\* \* \* \* \*